S. E. COUCH.
DEVICE FOR TESTING ARMATURES.
APPLICATION FILED NOV. 25, 1919.

1,373,383.
Patented Mar. 29, 1921.

INVENTOR,
Stephen E. Couch,
BY Harry W. Bowan.
ATTORNEY.

UNITED STATES PATENT OFFICE.

STEPHEN E. COUCH, OF SPRINGFIELD, MASSACHUSETTS, ASSIGNOR TO HOMER J. POOLE, OF SPRINGFIELD, MASSACHUSETTS.

DEVICE FOR TESTING ARMATURES.

1,373,383.  Specification of Letters Patent.  Patented Mar. 29, 1921.

Application filed November 25, 1919. Serial No. 340,650.

*To all whom it may concern:*

Be it known that I, STEPHEN E. COUCH, of Springfield, Hampden county, and Commonwealth of Massachusetts, a citizen of the United States of America, have invented certain new and useful Improvements in Devices for Testing Armatures, of which the following is a specification.

This invention relates to improvements in electrical apparatus for testing the coils or individual windings of a closed circuit armature such as are used in connection with the ignition system of motor vehicles. Usually a direct current generator is employed for supplying the electric current for the ignition, and also for charging the storage battery when a battery ignition system is employed. Oftentimes, a coil or coils of the armature are broken, burned out, or otherwise defective, thus rendering the operation of the generator imperfect, producing a heating effect in the armature and field and generally reducing the efficiency of the machine as a whole. The present invention is designed for quickly locating a broken or defective winding or coil of the armature. It comprises, in general, a field capable of being magnetized and in which is located the armature that is to be tested. Supporting means are provided to permit the rotation of the armature by hand through a small arc at a time. The armature is temporarily located in this magnetic field, the magnetism being provided by means of a coil through which flows an alternating current or if desired a pulsating current may be used. The lines of force so generated by the current are caused to pass through the windings of the armature. A thin piece of iron or steel, or other magnetizable material is located or placed preferably within the magnetic field and placed in loose contact with the armature, this thin piece of steel being for the purpose of shunting or directing all, or a portion of the lines of force therethrough should the windings on the armature disclose a break or other defect.

Referring to the drawings.

Figure 1:
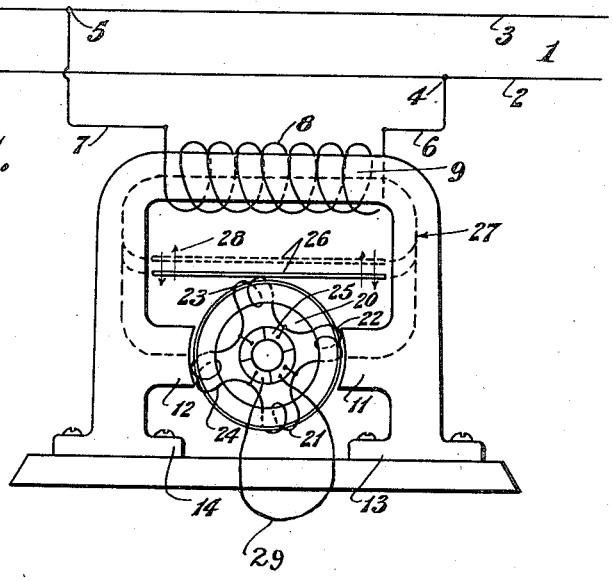
Figure 1 is a diagrammatic view of a magnetizable field, preferably composed of laminations, a source of electrical energy, and a coil connected with the source of energy, said coil being located about a portion of the magnetic circuit of the field, also showing the armature under test, and located in the field.
Figure 2:
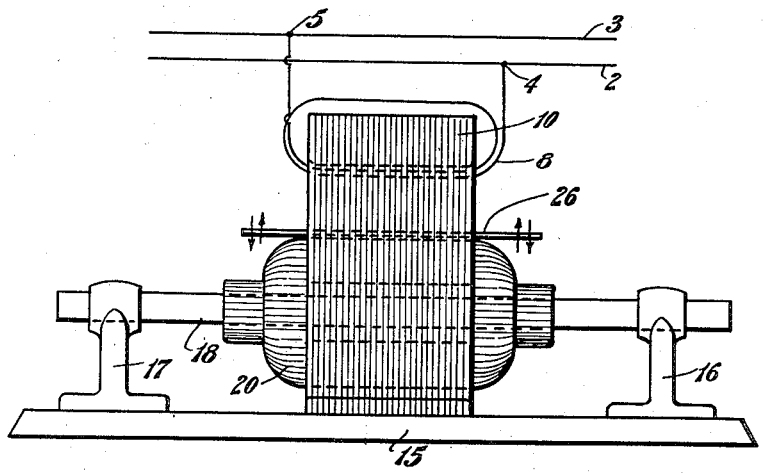
Fig. 2 is an end elevational view of Fig. 1 showing the manner of rotatably supporting the armature, an edge view of the thin piece of steel or other magnetizable material in the field, and connections to the primary coil on the field with the source of electrical energy.

Referring to the drawings in detail; 1 designates a source of alternating current indicated by means of the wires 2 and 3. Connected to these wires, at the points 4 and 5, are the wires 6 and 7, which in turn are connected to the terminals of the primary winding 8. This winding is located on the yoke portion 9 of the magnetizable field member which is preferably composed of laminations of soft iron indicated in Fig. 2 at 10, for the purpose of lessening the generation of eddy currents. These laminations preferably are stampings and are secured together by any suitable means. They are formed with inwardly extending pole pieces 11 and 12, and foot portions 13 and 14. Located on the standard 15 are the armature shaft bearing posts 16 and 17 in which the shaft 18 of the armature under test is supported for hand rotation. The armature as a whole is indicated by the reference numerals 20, which may be either a ring or a drum construction. The windings or coils thereon are conventionally indicated by the numerals 21, 22, 23, and 24, which in turn are connected, in the usual manner, to the commutator bars 25.

Located within the field member and preferably on the armature 20 is a thin piece of magnetizable material 26, as a thin sheet of iron or steel. When an alternating or pulsating current is impressed upon and flows through the coil 8, magnetic lines of force are set up in the field 9 as indicated by the dotted line 27. These lines of force will flow alternately from one pole piece to the other and also through the armature core and windings thereon. As the armature is turned by hand through a small arc and in a step by step manner to successively bring the windings into the path of the lines of force through the pole pieces, each one of the windings or coils, in turn, are subjected to these lines of force. If there are no coils broken or defective, the piece of magnetizable material 26 will remain stationary. Should the usual path for the lines of force 27 be broken, due to defective insulation, causing a short circuit between the coils, then the piece 26 vibrates, as indicated by the arrows 28, by reason of the alternating magnetic flux flowing through the plate, thus indicating to the observer that the armature is defective. In this way, and by means of this apparatus, it is possible to accurately locate a single defective winding or turn of wire on the armature when the armature is slowly rotated and observing the action of the thin piece of steel 26.

Heretofore it has been the common practice to test by means of exploring terminals which are connected to an electrical instrument, by placing the terminals on the bars in succession. This method is not only slow, but is inaccurate, since it tests all of the windings of a coil and not any individual turn of the winding of the coil, whereas the present device will determine a defect wholly or partially in a single turn of the coil.

In order to test the armature for a broken wire or open circuit in the coils, the ends of a jumper wire 29 are placed in succession on two of the adjacent commutator bars 25, as shown, then when the armature is turned the plate 26 will continue to vibrate until the open circuit coil is located, when it will cease to vibrate when the jumper wire is used by reason of the fact that the open circuit again restores the normal condition by the wire 29 and the normal path for the magnetic flux is completed. It may be stated that the apparatus shown comprises, in effect, a transformer, in which the primary winding is the coil 8, and the secondary windings are the coils on the armature core. The alternating flux setting up a current in these armature coils. If one of the coils is defective, as a short circuit, the normal condition of the magnetic circuit is disturbed and the flux is then shunted through the plate 26, causing it to vibrate, as stated. When an open circuit occurs in the armature coils, the plate 26 will continue to vibrate until the coil is found which is open, then it will cease to vibrate, but when the jumper wire 29 is used it will again commence to vibrate, as described.

What I claim is:

1. An electrical testing apparatus, for testing the coils of an armature and comprising, in combination, of a magnetizable field member, means for rotatably mounting the armature in the field, means for energizing the field with an alternating or pulsating current, a device for testing the magnetic circuit of the armature including a loosely mounted magnetizable piece of material.

2. In a device for testing the windings of a closed coil armature, comprising, in combination, a magnetizable field, a primary winding for inducing lines of force therein, vibratory means for shunting a portion of the lines of force of the field from their normal path through the armature.

3. An electrical testing apparatus for armatures comprising a field having pole pieces for receiving the armature under test therebetween, means for inducing a magneto motive force through the poles, and means for shunting a portion of the lines of force from the poles, said means comprising a thin piece of freely movable magnetizable material that is set in vibration when the armature shows defective coils upon rotation of the same in the field.

4. In an electrical testing apparatus for armatures, the combination, of a field having pole pieces, means for inducing an alternating magnetic flux therein, and loosely mounted means on the armature for shunting a portion of said flux from the pole pieces and adapted to be set in vibration when the lines of force are so shunted.

5. An armature testing apparatus for the purpose described, comprising, in combination, a magnetizable field, means for magnetizing the field including a source of alternating electric current, the field having polepieces designed to receive the armature therebetween to provide a circuit for conducting the lines of force through the armature, and loosely mounted means capable of vibration located in the field and adjacent the armature for providing a second path for the lines of force when the path through the armature is incomplete as described, by reason of defective wiring on the armature.

6. A device for testing the coils of an armature and comprising a magnetizable field, means for producing an alternating flux therein, the field having polar portions for receiving the armature therebetween and for providing a magnetic circuit from the field through the armature, and auxiliary means for providing a second magnetic circuit including a freely movable member which is adapted to be set into vibration when the normal magnetic circuit through the armature is defective.

7. An apparatus for testing the coils of an armature and comprising a magnetizable field member, means for supporting an armature in the field, means for inducing an alternating flux in the field, the field having polar portions for conducting the flux to and through the armature, and means within the magnetic field for furnishing an auxiliary path for the flux and which is normally at rest but capable of vibratory motion when the normal flux path through the armature is defective by reason of a broken winding or coil.

8. In an armature testing device, the combination of a magnetizable member, means for supporting an armature therein, means for inducing an alternating magnetic flux therein for setting up a corresponding flux in the armature to be tested, means for providing a path for the flux, separate from that through the armature and so arranged and designed to vibrate freely when the normal path through the armature is partially or wholly defective, as described.

9. In an armature testing device, the combination, of a field magnet, an armature therein, means for inducing an alternating magnetic flux in the field and through the armature, a plate in the field and adjacent the armature, said device serving to induce a current in the coils of the armature when the plate will remain stationary if the coils are not short circuited, but if said coils are short circuited the plate will vibrate.

10. An apparatus for locating an open circuit, in the coils of an armature and comprising, in combination, a magnetizable field member, a coil for magnetizing the field, means for rotatably supporting an armature in the field, a thin magnetizable plate in the field and located adjacent the armature, said plate being normally in a state of vibration if all of the coils of the armature are complete, as the armature is turned, but will not be set into a vibratory motion should a turn of the coil be broken or the circuit open, but will continue to vibrate when the coil is short circuited by means of a jumper or other device being placed on two adjacent commutator bars, as described.

STEPHEN E. COUCH.